United States Patent
Garg et al.

(10) Patent No.: US 6,834,303 B1
(45) Date of Patent: Dec. 21, 2004

(54) METHOD AND APPARATUS AUTO-DISCOVERING COMPONENTS OF DISTRIBUTED SERVICES

(75) Inventors: Pankaj K. Garg, Sunnyvale, CA (US); Mohamed Dekhil, Sunnyvale, CA (US); Klaus Wurster, Palo Alto, CA (US); Jerremy Holland, Los Altos Hills, CA (US); Martin L. Griss, Palo Alto, CA (US); Vijay Machiraju, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 09/711,785

(22) Filed: Nov. 13, 2000

(51) Int. Cl.[7] .............................................. G06F 15/16

(52) U.S. Cl. ........................ 709/224; 709/202; 370/254

(58) Field of Search ................................. 719/310–320; 709/200–203, 220–229; 718/100–106; 370/248, 254–258

(56) References Cited

U.S. PATENT DOCUMENTS 5,679,945 A * 10/1997 Renner et al. .............. 235/492

FOREIGN PATENT DOCUMENTS

WO   WO 98/58313   * 12/1998 ............. G06F/9/45

OTHER PUBLICATIONS

Deborah Caswell, et al, Using Service Models for Managing of Internet Services, Internet Systems and Applications Laboratory, HP Laboratories Palo Alto, HPL–1999–43, Mar. 1999, pp. 0–22.

* cited by examiner

Primary Examiner—St. John Courtenay, III

(57) ABSTRACT

An auto-discovery system discovers related components of a service operating on a distributed network. This auto-discovery system involves (1) selecting a model of the configuration of the service; (2) determining, from the model, "scope hints" that limit the possible locations of related components; (3) determining a root component of the service; (4) using scope hints to limit the search, to rapidly find related instances of components contained in the root service component; (5) determining whether a quorum of components comprising a distributed service has been discovered; (6) determining the parent service component of each discovered service component by instance matching; and (7) using the instance match information to determine the discovery tree of components that have the structure of the service map, share a common root component, and define a service group. This auto-discovery system efficiently discovers the components of a wide range of services within a distributed environment. The system limits the scope of searches for components related to previously discovered components. The system determines the relationships between the discovered service components, and matches them into groups of related services. This enables an operational manager of a distributed service to better determine service configurations, expand resource bottlenecks, and improve an end-users' experience.

20 Claims, 7 Drawing Sheets

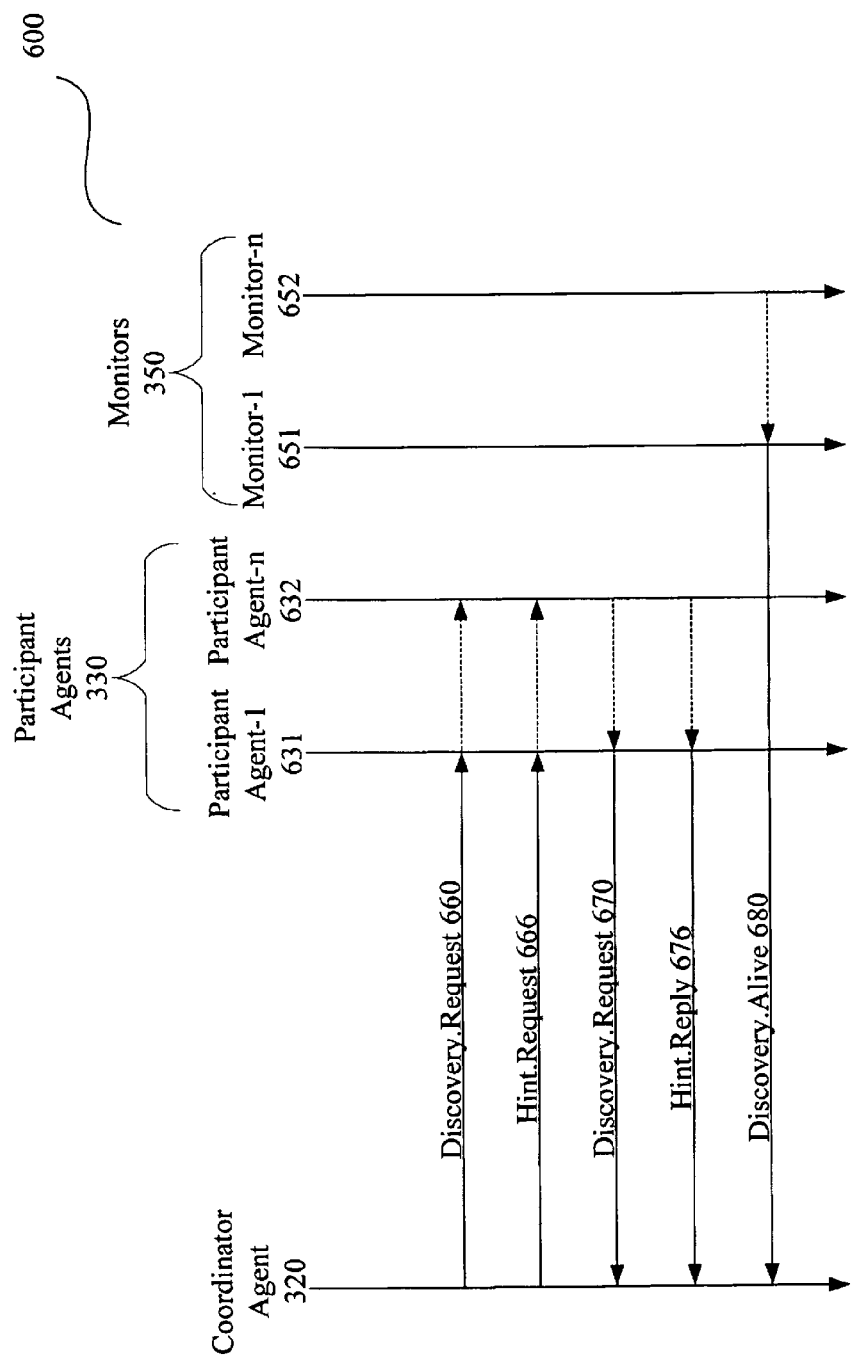

METHOD AND APPARATUS AUTO-DISCOVERING COMPONENTS OF DISTRIBUTED SERVICES

FIELD OF THE INVENTION

This disclosure relates to the field of auto-discovering service components and configurations for service management in a distributed environment.

BACKGROUND OF THE INVENTION

A distributed application, or service, is composed of many components running on different computer nodes in a network. Operational management of a distributed service entails processes such as determining resource bottlenecks, and expanding them to improve the end-users' experience. A basic requirement for providing such management is to identify the components that combine to provide a service. This set of components that participates in providing a service comprises a service configuration.

One approach to service configuration identification is manual inspection. An operator, while installing a service, or after installing a service, can enumerate and store the configuration description in a repository that can be accessed by a management solution. For a limited number of services with a limited number of components each, this is an adequate approach for determining configurations. For a large number of services, or for services with a large number of components, this approach is not very scalable, as manually updating a repository for a large number of service components can quickly become overwhelming. Maintaining a dynamic list of components, as new service components are made available, can also be tedious.

Another approach is for the service itself to record its configurations with management software. With multiple management requirements on any given service, this approach is not very practical.

A more practical approach is for services to register their configurations in a standard repository. Then, different management software can glean the appropriate information from this repository. Systems such as Microsoft's Systems Management Server and Common Information Model (CIM) from the Distributed Management Task Force (DMTF) promise to provide such a standard repository.

Another common situation is when services do not store information about their components in any standard way. The configuration information has to be derived or deduced from observing properties of the service and its incarnations on the various nodes in a network. This approach has been explored by Ramanathan et al., "Auto-Discovery Techniques for Internet Service Management" HPL Technical Report #HPL-99-43. The approach described therein works well for discovering service components.

However, for discovering a set of related service components that make up a bigger service, it falls short in two ways: (1) once a service component is discovered, there is no mechanism to effectively limit the number of machines to be examined for a set of related service components; and (2) there is no mechanism to match instances of service components into a group of related services.

Thus, there is a need in the art for an improved method and apparatus to perform auto-discovery of distributed services. The auto-discovery system should efficiently discover component instances of a distributed service. Upon discovering a component instance, the system should efficiently search the distributed service for other related component instances. Upon discovering a set of component instances, the system should determine relationships between the component instances and match them into groups of related services. The auto-discovery system should also be applicable to a wide range of distributed services.

SUMMARY OF THE INVENTION

This disclosure is directed towards a method and apparatus for auto-discovering configurations for service management and scoping the discovery of service components.

The auto-discovery involves (1) selecting a model of the configuration of the service; (2) determining, from the model, "scope hints" that limit the possible locations of related components; (3) determining an instance of a root component of the service; (4) using scope hints to limit the search for auxiliary component instances coupled to the root service component instance; (5) determining when a quorum of component instances comprising a complete distributed service has been discovered; (6) determining the parent service component of each discovered service component by instance matching; and (7) using the instance match information to determine a discovery tree of component instances that have the same structure as the service map, share a common root component instance, and define a service group.

This auto-discovery system (1) is applicable to a wide range of distributed services; (2) efficiently discovers instances of service components; (3) upon discovering an instance of a new component on a distributed service, efficiently searches the distributed service for other related components; and (4) upon discovering a set of service components, determines the relationships between instances of service components and matches them into groups of related services.

These and other objects, features, and advantages of the present invention will be apparent from the included drawings and from the following detailed description.

BRIEF DESCRIPTION OF THE DRAWINGS

The objects, features, and advantages of the present invention will be apparent to one skilled in the art, in view of the following detailed description in which:

FIG. 6 illustrates message flow during service discovery.

DETAILED DESCRIPTION OF THE INVENTION

Auto-discovery of the configurations of a wide range of distributed services can be achieved using the auto-discovery solution of the invention. To address auto-discovery of service configurations, two broad technical problems must be addressed: (1) how to deduce the presence or absence of a service component and its properties in a network, and (2) how to communicate this information in a timely and accurate manner to the appropriate management software. This disclosure describes a model-driven approach to address the first issue and a generic software bus as part of the discovery engine for the second.

One embodiment of an auto-discovery model includes a Common Information Model (CIM) to represent a service model, and a CIM Object Manager (CIMOM) to store each defined service model. A service model comprises classes of service components, instances of each class, and interactions between classes. That is, parts of the model represent (1) a service map; (2) the discovered service instances of elements related to the service map; and (3) policies including scoping hints and scripts, that form a template of service component interactions and assist the process of discovering service component instances and their interactions.

Figure 1:
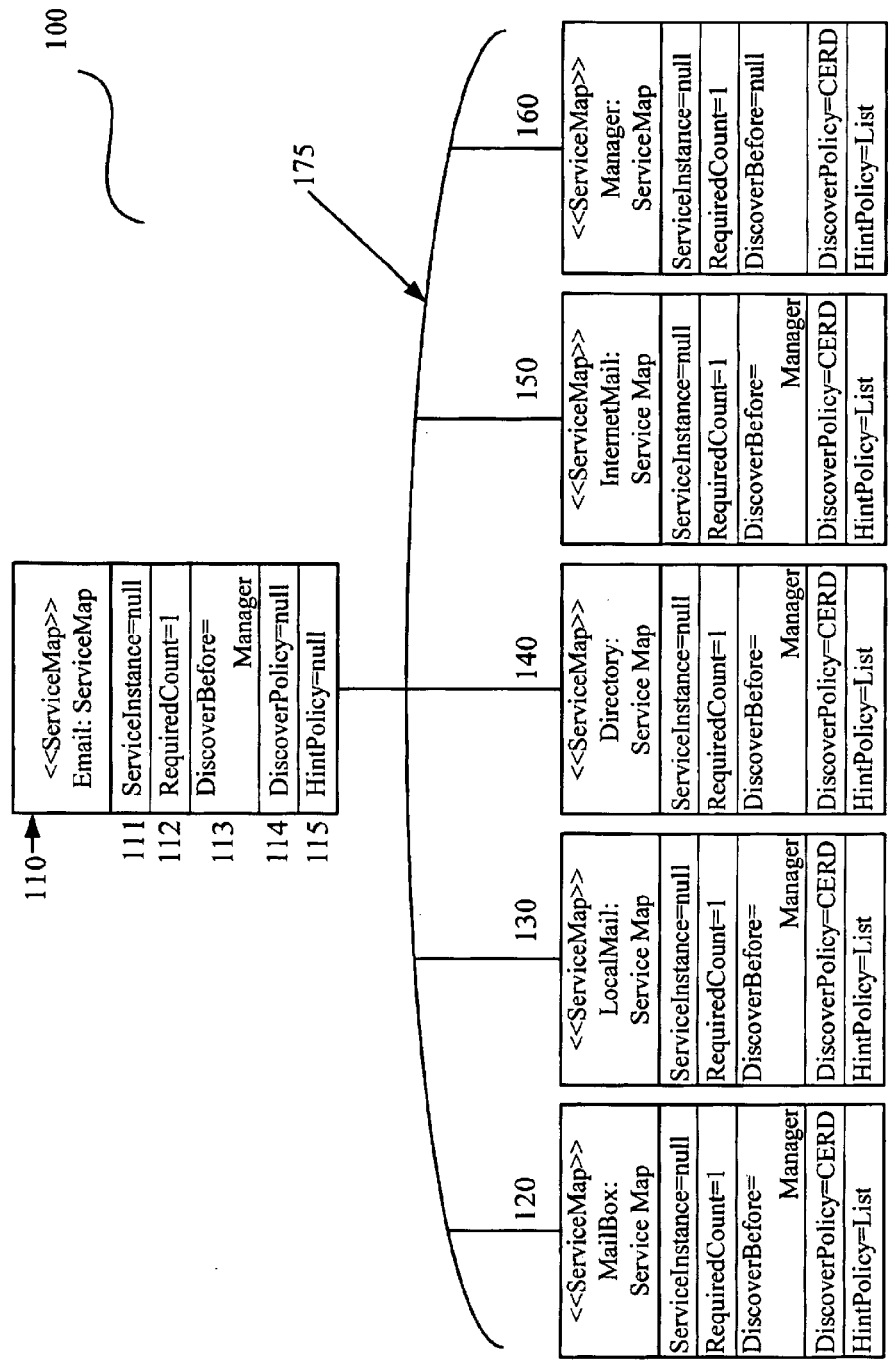
FIG. 1 illustrates a service map of a distributed service.

A service map describes a service to the discovery engine. FIG. 1 illustrates an example of a service map for an email service. Service map 100 includes: (1) service group component "Email" 110; (2) service component "Mail-box" 120; (3) service component "Local Mail" 130; (4) service component "Directory" 140; (5) service component "Internet Mail" 150; and (6) service component "Manager" 160. Each component node (e.g. 110, 120, 130, 140, 150, or 160) represents a component class and each branching arc (e.g. 175) represents a containment relationship, wherein all component classes (120, 130, 140, 150 and 160) below the branching arc 175 are contained within the component (110) that is above and connected to the branching arc 175.

A component class is characterized by a set of attributes (e.g. 111–115). Component class attributes provide information regarding how to define, locate and distinguish the specified class. Examples of component class attributes for the component class "Email" 110 include "ServiceInstance" 111, which describes the number of discovered instances of the specified component class; "RequiredCount" 112, which describes the minimum number of instances of the specified component class that can define a complete service; "DiscoverBefore" 113, which defines a service component instance that should be discovered before searching for instances of the specified component class; "DiscoverPolicy" 114, which defines the search process used to discover instances of the specified component class; and "HintPolicy" 115, which limits the scope of the search for instances of the specified component class. The values of the component class attributes are updated during the discovery process. A root service component node 110 in the service map identifies a service grouping. The root service component node 110 generally contains other service component nodes, such as nodes 120, 130, 140, 150 and 160, in a parent-child relationship. Thus, as an example, "Email" service 110 may be a root "parent" service that contains auxiliary "child" services "Mailbox" 120, "Local Mail" 130, "Directory" 140, and "Internet Mail" 150. Each of the child service component nodes of parent root service component node 10 may also be a parent, in a parent-child relationship containing other service component nodes (not shown). For example, service component class "LocalMail" 130 might contain child component classes such as local area internal mailboxes and directories.

Figure 2:
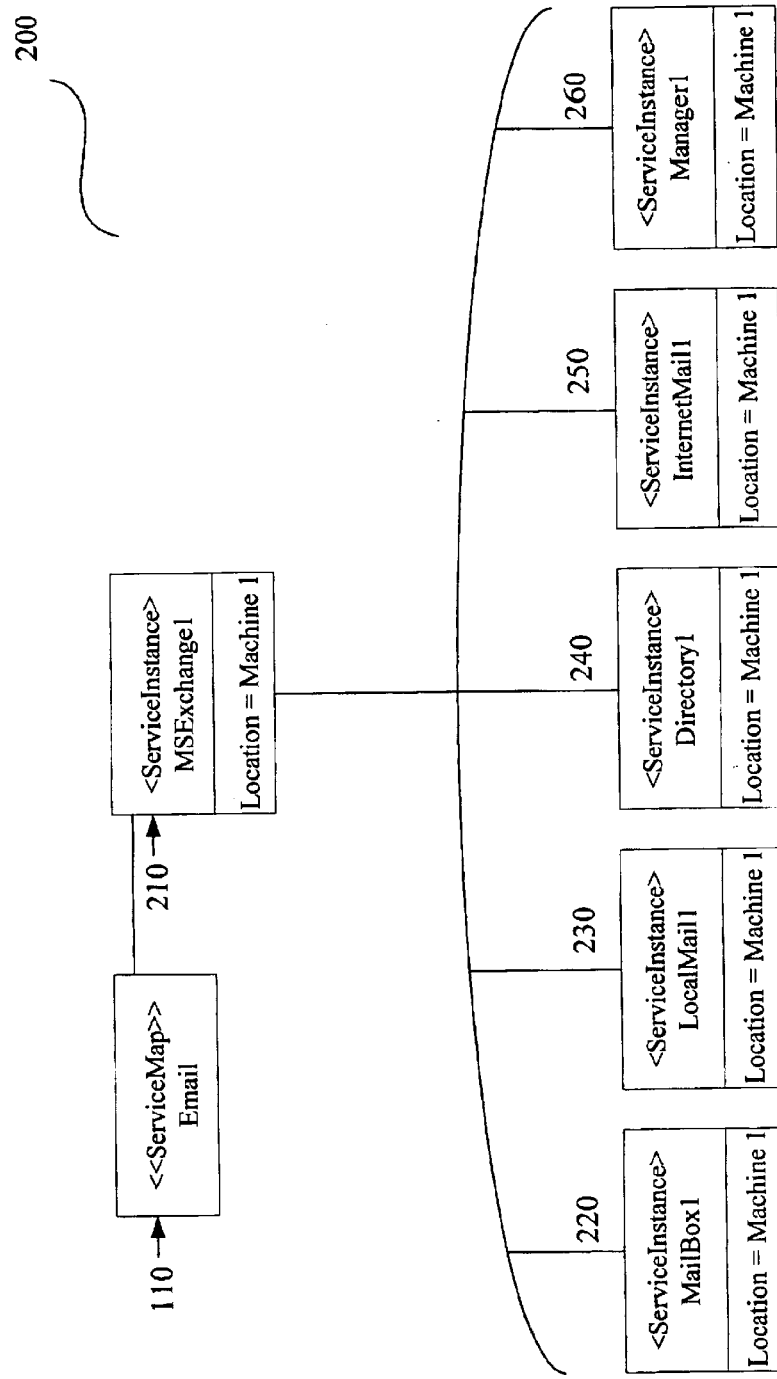
FIG. 2 illustrates a tree of discovered service instances in a distributed service.

A service instance is a concrete component of a service discovered and instantiated during a successful discovery. Each service instance is related to a corresponding component class of a service map with a corresponding discovered services relationship. FIG. 2 illustrates an example of a discovery tree of services instantiated in an email service related to Email service map 100 of FIG. 1. Example of service instances 200 includes: (1) "Email" service instance "MSExhange 1" 210; (2) "Mail-box" service instance "MailBox 1" 220; (3) "Local Mail" service instance "LocalMail 1" 230; (4) "Directory" service instance "Directory 1" 240; (5) "Internet Mail" service instance "InternetMail 1" 250; and (6) "Manager" service instance "Manager 1" 260. The specific discovered instances of service components have the same parent-child relationships as the classes of components described in the service map. For example, "MSExhange 1" 210 is an email service that may be a root component instance of the root service component "Email" 110. Root component instance "MSExhange 1" 210 contains auxiliary service component instances such as "Mail-box" service instance "MailBox 1" 220; (3) "Local Mail" service instance "LocalMail 1" 230; (4) "Directory" service instance "Directory 1" 240; (5) "Internet Mail" service instance "InternetMail 1" 250; and (6) "Manager" service instance "Manager 1" 260. Each of these specific discovered instances of service components 210–260 have the same parent-child relationships as the classes of components 110–160 described in the service map.

Policies direct the auto-discovery process, providing a mechanism for discovery in the form of scripts and procedures. Policies describe the method, order and scope of application of the procedures comprising the discovery process.

Examples of hint policies (scope hints) include: (1) "Parent"; (2) "List"; (3) "DNS"; and (4) "None". When the scope hint is "Parent", service component instances are searched for only on the same machine as the parent service component instance in the discovery tree. When the scope hint is "List", then, a list of machines is specified in the discovery tree. The service component instance search is only performed on the listed machines. Note that the discovery tree contains dynamic information; hence the list of machines could have resulted from a previous search. When the scope hint is "DNS", a domain name server, or its equivalent, is asked for a list of machines to search. The DNS mechanism is commonly used to search for service component instances at the root of discovery tree. Hint policies may be included in a service map (e.g. at 115) as shown in FIG. 1. Such policies limit the scope of a discovery search process.

Discovery policies include: (1) "CERD", use Central Execution to search Remote Data; (2) "CECD", use Central Execution to search Central Data; and (3) "RE", use Remote Execution to search Data. Discovery agent policies indicate whether the discovery process can be carried out by a central coordinator agent or if it requires the installation of a participant agent on a machine more directly connected to a service to be discovered.

Figure 3:
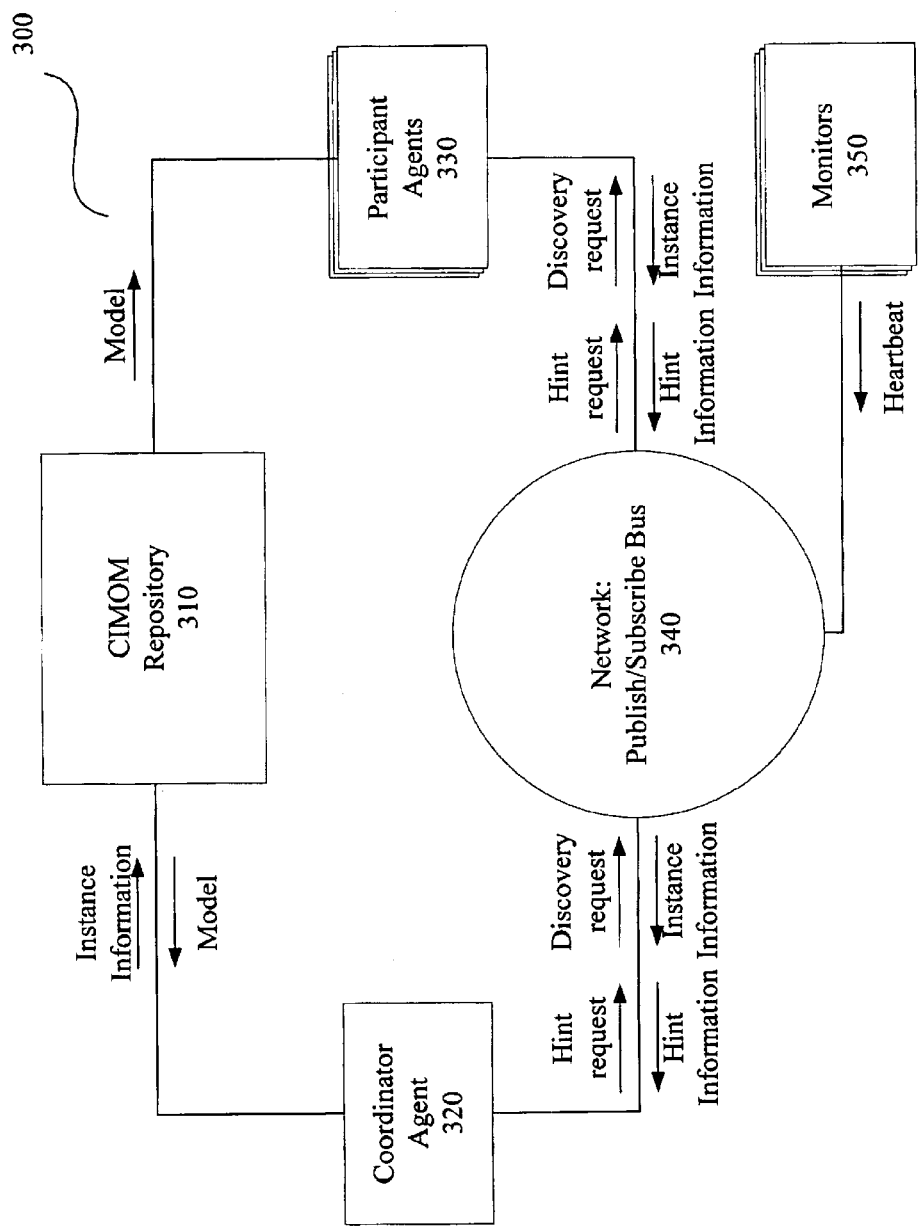
FIG. 3 illustrates components of a service discovery engine.

Primary components of the discovery engine are illustrated in FIG. 3. Discovery engine 300 includes: (1) CIMOM repository 310; (2) discovery coordinator agent 320; (3) discovery participant agents 330; (4) Network: Publish/Subscribe Bus 340; and (5) monitors 350. CIMOM repository 310 stores the model information, including service maps, instance information and policies. CIMOM repository 310 receives new instance information from coordinator agent 320, and returns updated service models. CIMOM repository 310 also sends updated service models to participant agents 330. Coordinator agent 320 sends discovery and hint requests to the Network Bus 340, and receives service instance and hint information in return. Network Bus 340 sends discovery and hint requests to participant agents 330, as specified by coordinator agent 320. Participant agents 330 return service instance and hint information to Network Bus 340. Network Bus 340 also receives service instance heartbeat information from monitors 350.

One embodiment of the discovery engine comprises software components operating on one or more computers coupled to the Network 340. The engine architecture is designed to be flexible, so that extremes from (a) a coordinator agent 320 on a central machine and one participant agent 330 on each node in the network, to (b) the coordinator agent 320 and all its participant agents 330 on the same machine; are possible. No a priori assumptions about the relative location of the coordinator agent 320 and participant agents 330 are made. Architecture is guided by the performance and security requirements of a given situation.

In one embodiment, the coordinator agent 320, participant agents 330, and monitors 350 determine a service model from central CIMOM repository 310. The coordinator agent 320 maintains a set of services and associated data structures that help it in the discovery process. It issues requests for discovery of service components. Participant agents 330 listen on Network Bus 340 for such discovery requests. If a discovery request is targeted towards a particular participant agent 330, it looks for the components on machines as directed by the request. If it discovers the component, it publishes a success message on Network Bus 340 for the coordinator agent 320. If it doesn't find a component on a given machine, it publishes a failure message on the Network Bus 340. As instances of service components are discovered, the coordinator agent stores the results in CIMOM repository 310. An optional enhancement includes monitors 350 that are installed at instances of discovered components. The monitors 350 issue repeating messages (heartbeats) that confirm continued operation of the discovered instance.

Figure 4:
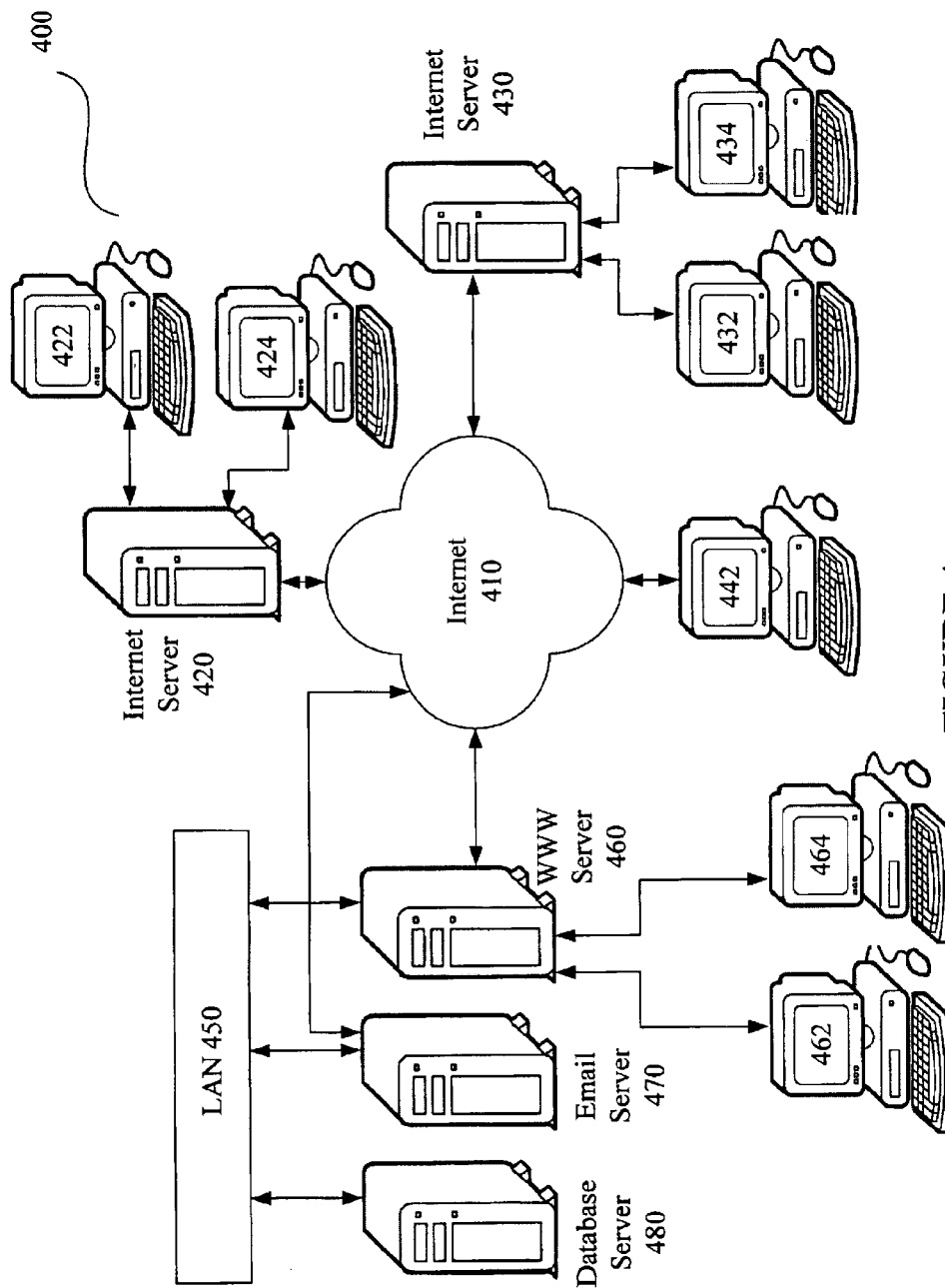
FIG. 4 illustrates an embodiment of a distributed service/network environment for auto-discovery.

The auto-discovery engine is applied in the environment of a distributed system or network such as the Internet, a Wide Area Network (WAN), a Local Area Network (LAN), a wireless network, and/or another network. A distributed environment can comprise any subset or combination of such networks. FIG. 4 illustrates one such embodiment of a network environment 400 for a discovery engine 300 described in FIG. 3. Network environment 400 includes: (1) the Internet 410; (2) internet servers 420 and 430; (3) Local Area Network 450; (4) WWW Server 460; (5) Email Server 470; (6) Database Server 480; and (7) workstations 422, 424, 432, 434, 442, 462, and 464. Many Internet servers such as Internet Servers 420 and 430, WWW Server 460, and Email Server 470 connect to the Internet 410. Many workstations such as workstation 442 connect directly to the Internet 410 (e.g. through a cable or telephone line). Many workstations connect to the Internet through a server, such as workstations 422 and 424, 432 and 434, and 462 and 464; through Servers 420, 430 and 460 respectively. A workstation may comprise a fixed, portable, or handheld computing device. Servers such as WWW Server 460, Email Server 470, and Database Server 480 may simultaneously be connected together by other means, such as Local Area Network 450. Some workstations may also connect to Local Area Network 450. For example, workstations 462 and 464 connect to Local Area Network 450 through WWW Server 460. In this manner, a large distributed system is formed, that offers many services having related service components located within an extremely large number of devices.

In many embodiments of the invention, components of discovery engine 300 described in FIG. 3 are distributed within network environment 400 in different ways. In one embodiment, CIMOM repository 310, discovery coordinator agent 320 and Network Bus 340 may be contained within a single system such as WWW server 460. Discovery participant agents may also be contained within WWW Server 460, or may be distributed throughout the network, such as within Servers and workstations 420–480. Monitors 450 may similarly be distributed throughout the network.

Figure 5A:
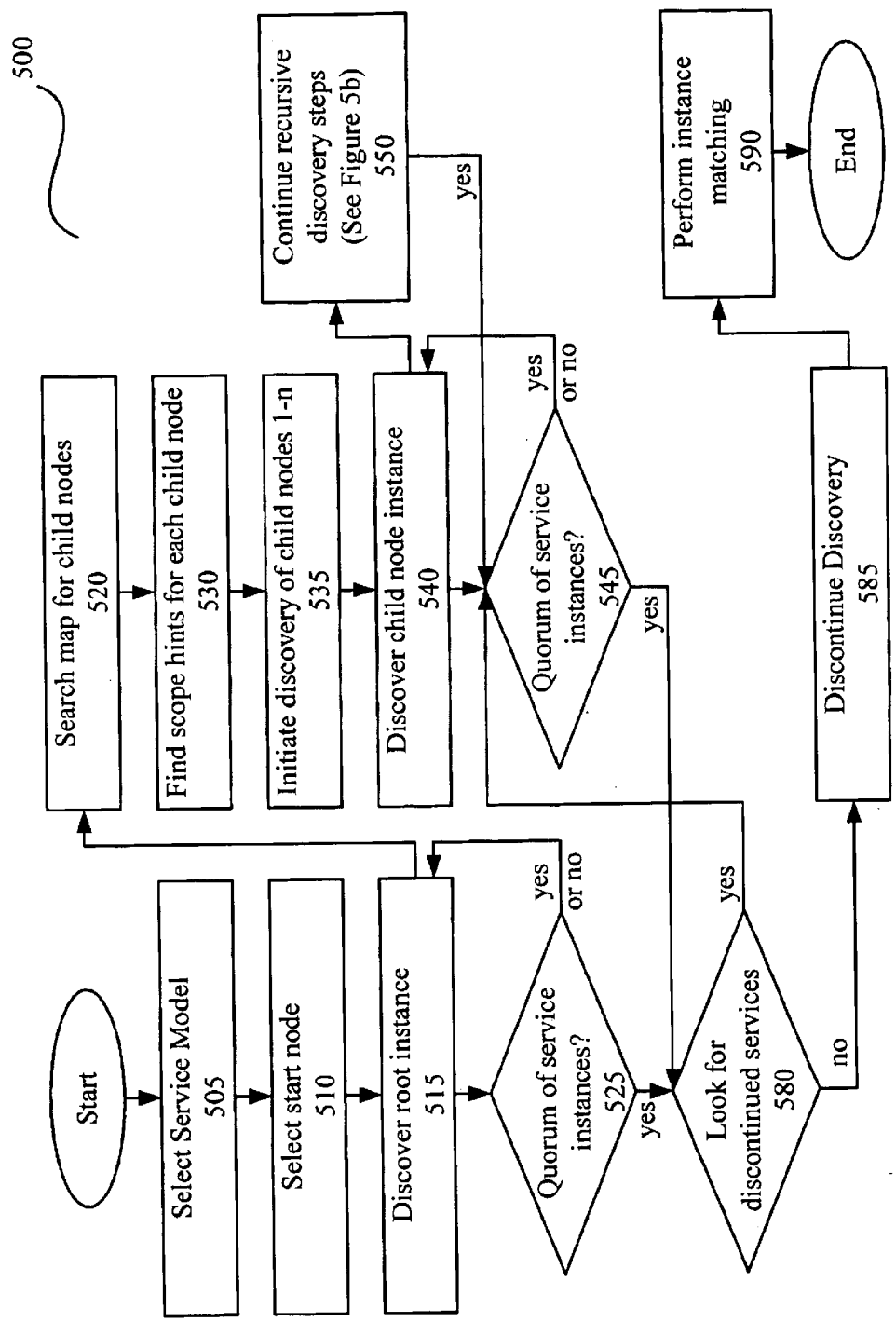
FIG. 5a illustrates a service discovery flow diagram.

A flow diagram of one embodiment of the auto-discovery process is illustrated in FIG. 5*a*. Discovery process flow 500 includes the following steps: (1) select service model 505; (2) select start node 510; (3) discover root node service component instance 515; (4) search service map for child nodes 520; (5) determine whether a quorum of service component instances has been discovered 525; (6) find scope hints for discovery of each child node service component 530; (7) initiate discovery of child node service component instances 535; (8) discover child node service component instance 540; (9) determine whether a quorum of service components has been discovered 545; (10) recursive discovery steps 550; (11) check heartbeat monitors for discontinued services 580; (12) discontinue discovery 585; and (13) instance match to determine service groups 590.

At Step 505, a discovery goal and search limits are determined; and a service map is selected.

At Step 510, a discovery start node is selected and coordinator agent 320 (FIG. 3) is activated by a user interface or an agent of the user interface to discover a particular service class. The discovery coordinator agent 320 receives the discovery request from the discovery console, amends the set of services for discovery; and executes a multiphase coordination process to discover component services for these complex services.

At step 515, coordinator agent 320 initiates a discovery request for the root service components of a given service on the possible machines. A root service component is defined as a service component that can be discovered without requiring the discovery of any other service component. A root service component's location is dependent on its own properties rather than the existence of any other service component. The coordinator agent 320 reads the selected service map for from a CIMOM repository and finds out the possible machines in its domain on which root services are expected. This is often done through a network or service discovery such as the Microsoft browsing service, the network node manager topology discovery, or a domain name service. Then, the search for root component instances continues until a root service instance is discovered.

At step 520, when a root service component instance is discovered, coordinator agent 320 determines the auxiliary child services contained by that root service component.

At step 530, the scope of the search for each child service component is determined from policies such as the scope hints and discovery agent policies included in the service map.

At step 535, coordinator agent 320 targets requests for discovery of the specified child service components to specific machine groups based on discovered scope hints. Requests are issued to Network Bus 340 (FIG. 3).

Step 525 proceeds concurrently with step 530. In step 525, coordinator agent 320 uses available instance information to determine whether a quorum of services has been achieved. If a quorum is achieved, the process jumps to step 580. In any case, the search for root component instances is continued at 515. Quorum determination is recursively repeated as new instances of service components are discovered. A quorum is achieved when each component class of a service has a minimum required number of instances discovered.

At step 540, an instance of a child node service component is discovered.

Figure 5B:
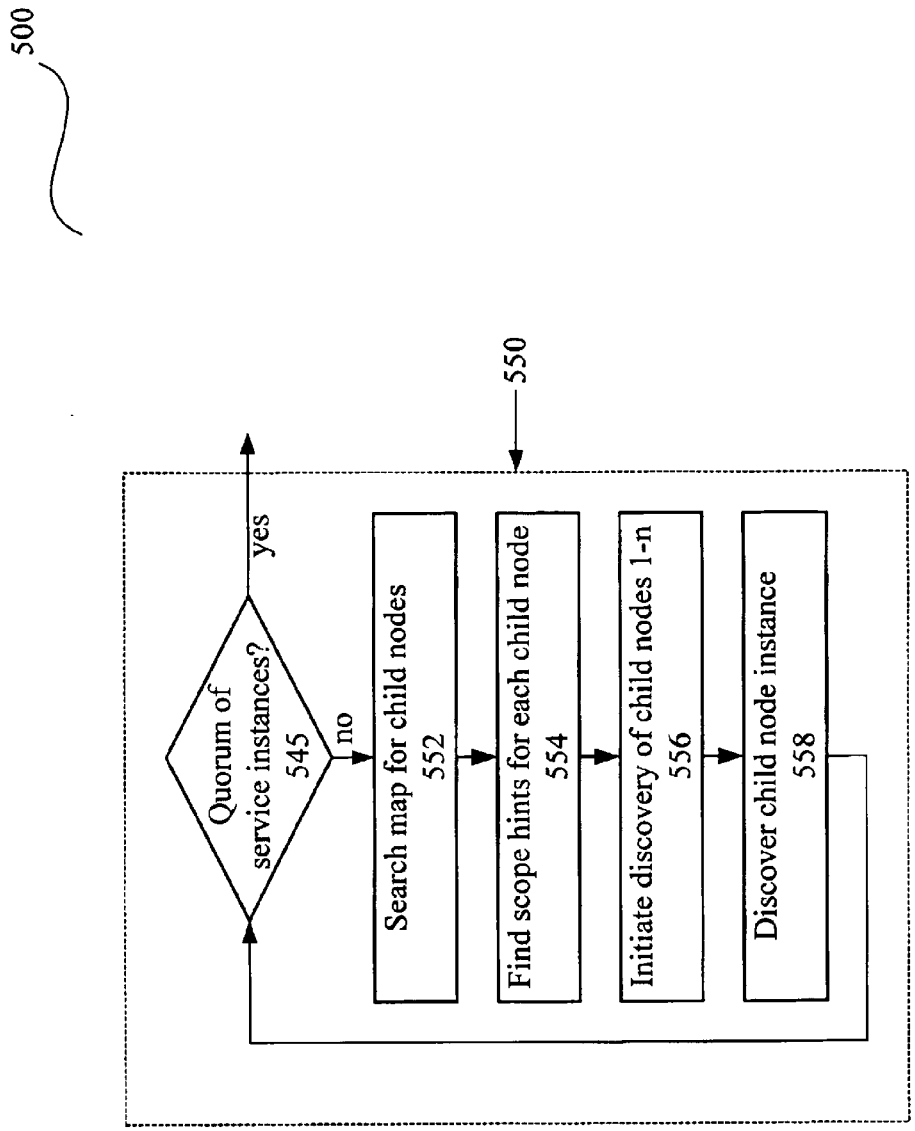
FIG. 5b illustrates a service discovery flow diagram.

At this point, a series of steps similar to steps 520–540 are repeated in 550, for discovery of the auxiliary child service components contained by the service component discovered in step 540; while step 545 concurrently checks for a quorum of discovered components. As illustrated in FIG. 5b, step 550 includes: (1) search service map for child nodes 552; (2) find scope hints for discovery of each child node service component 554; (3) initiate discovery of child node service component instances 556; (4) discover child node service component instance 558; and (5) determine whether a quorum of service components has been discovered 545. Series of steps 550 is continued for as many levels as is necessary to complete a discovery tree of service component instances related to a given service map. That is, all of the service component classes that must be discovered for a given service are arranged as nodes on the service map, and instances of each component class are discovered to complete a related discovery tree. Discovery starts with components at the root, and then once a component is discovered at level n, discovery of services at level n+1 is initiated. For each new level, another series of discovery steps similar to 550 is used.

At step 580, determination (in step 525 or step 545) of achievement of a quorum of service instances for the selected discovery causes a search of monitor heartbeats for discontinued, discovered services. If a discontinued service is discovered, another quorum check is performed using this new information. If no discontinued services are found, a quorum of service component instances have been located, and the process flow proceeds to 585.

At step 585, the discovery process is discontinued, and all concurrent search loops 515–550 are stopped.

At step 590, the discovered instances are instance matched to their parents in the discovery tree, to determine related components that comprise service groups defined by the service map.

Then, the process ends.

The flow of the discovery process illustrated in FIGS. 3 and 5 relies on message exchange among the coordinator agent 320, participant agents 330, and monitors 350, as illustrated in FIG. 6. One embodiment of message exchange flow 600 includes: (1) coordinator agent 320; (2) participant agents 330 represented by Participant agent-1 631 and Participant agent-n 632; (3) monitors 350 represented by Monitor-1 651 and Monitor-n 652; (4) Discovery.Request 660; (5) Discovery.Reply 665; (6) Hint.Request 670; (7) Discovery.Reply 675; and (8) Discovery.Alive 680.

Messages 660, 665, 670, 675 and 680 carry out auto-discovery of a service, by providing the following functions. Discover.Request [service component class, machines] 660 is a message from coordinator agent 320 to one or more participant agents 330, requesting the participant agent on the listed machines to participate in the discovery of the specified service component. Discovery.Reply [service component class, service component name, machine, attribute names and values] 665 is a message from one or more participant agents 330, informing the coordinator agent 320 that it has found an instance of the requested service component. The names and values of the attributes of the discovered service component instance are also propagated to the coordinator agent 320. Hint.Request [service component class, machines] 670 is a message from coordinator agent 320 to one or more participant agents 330 on listed machines, requesting hints about possible locations for the given service component. Hint.Reply [service component class, machines] 675 is a message from one or more participant agents 330, to the coordinator agent 320, specifying the machines on which instances of the given service class may be found. Discovery.Alive [service component class, instance] 680 is a heartbeat message from the monitors 350, informing a coordinator 320 about the aliveness of a service component instance that was discovered earlier. This is used to detect failures of service components that were discovered at some earlier time.

In one embodiment, the discovery coordinator agent 320, participant agents 330, and monitors 350 are implemented in C++ component object module (COM) and the communication among them is de-coupled using Network publish-subscribe bus 340 (also implemented in COM). Coordinator agent 320, participant agents 330 and monitors 350 publish and subscribe to specific topics of messages that identify pre-defined channels of communication on Network Bus 340. A flexible message structure is used, that does not enforce the nature or types of message attributes. This permits dynamic addition of information fields. In principle, the same message may be published on several different topics, for different purposes.

Once discovery of a set of service components is completed (step 485), the discovery tree is used to match service component instances that belong together in a group. The auxiliary components whose discovery was initiated by a given service component all belong together in the same instance group and collectively form a bigger service. Therefore, discovery of a new instance of a component at the root of the discovery tree thus starts a new instance group; while discovery of a new service component instance at any other level of the discovery tree requires placement in an existing service instance group. The appropriate service group is identified by matching the location of the service that is at the root of the discovery tree with the location of the newly discovered instance.

The auto-discovery solution describe herein has several advantages over the prior art. This auto-discovery system is applicable to a wide range of distributed services and efficiently discovers instances of service components. Upon discovering instances of a component on a distributed service, the system efficiently searches the distributed service for related component instances. Upon discovering a set of service component instances, the system determines the relationships between the service component instances and matches them into groups of related services. This enables an operational manager of a distributed service to better determine service configurations, expand resource bottlenecks, and improve an end-users' experience.

The foregoing has described a new method and apparatus for auto-discovering distributed systems. Although the invention is described with respect to a preferred embodiment, modifications thereto will be apparent to those skilled in the art. It is contemplated that changes and modifications may be made to the materials and arrangements of elements of the present invention without departing from the scope of the invention. Therefore, the scope of the invention is to be determined by reference to the claims that follow.

We claim:

1. A method for auto-discovery of at least one service in a distributed environment comprising:

a) selecting a service map comprising service component classes of a service to be discovered, including a root component and policies, for a service operating in said distributed environment;

b) discovering instances of said root component of said service map; and c) using said policies and said service map to determine locations in said distributed system for discovering instances of auxiliary components of said service that are coupled to one of said instances of a root component.

2. The method as claimed in claim 1, further comprising continuing said discovering instances of auxiliary components until a quorum of instances of each component class included in said service map is discovered.

3. The method as claimed in claim 2, further comprising:
   a) achieving said quorum;
   b) determining a parent component instance for each discovered instance of an auxiliary component; and
   c) grouping all discovered instances with their parent component instances to form service groups comprising all instances of components contained by each of said instances of a root component.

4. The method as claimed in claim 1, wherein a coordinator agent controls said discovering.

5. The method as claimed in claim 4, wherein participant agents, as directed by said coordinator agent, perform portions of said discovering.

6. The method as claimed in claim 4, wherein said service map and the discovered instances are stored in a Common Information Model Object Manager, CIMOM, repository connected to said coordinator agent.

7. The method as claimed in claim 5, wherein instance information is updated by monitors issuing repeated messages.

8. The method as claimed in claim 7, wherein messages between said coordinator agent, said participant agents and said monitors are transmitted across a network bus.

9. An apparatus for auto-discovery of at least one service in a distributed environment comprising:
   a) a service map including service component classes, a discovery tree, and policies;
   b) a first program code for discovering instances of a root component of said service map; and
   c) a second program code using said policies and said service map to determine locations in said distributed system for discovering instances of auxiliary components of said service that are coupled to one of said instances of a root component.

10. The apparatus as claimed in claim 9, further comprising a third program code continuing said discovering instances of auxiliary components until a quorum of instances of each component class included in said service map is discovered.

11. The apparatus as claimed in claim 10, further comprising:
   a) a fourth program code determining a parent component instance for each discovered instance of an auxiliary component; and
   b) a fifth program code grouping all discovered instances with their parent component instances to form service groups comprising all instances of components contained by each of said instances of a root component.

12. The apparatus as claimed in claim 9, wherein a coordinator agent controls said discovering.

13. The apparatus as claimed in claim 12, wherein participant agents, as directed by said coordinator agent, perform a portion of said discovering.

14. The apparatus as claimed in claim 13, wherein said service map and the discovered instances are stored in a repository connected to said coordinator agent.

15. The apparatus as claimed in claim 14, wherein said repository comprises a Common Information Model Object Manager, CIMOM, repository.

16. The apparatus as claimed in claim 14, wherein instance information is updated by monitors issuing repeated messages.

17. The apparatus as claimed in claim 16, wherein messages between said coordinator agent, said participant agents, and said monitors are transmitted across a network bus.

18. An apparatus for auto-discovering of service configurations comprising:
   a) a coordinator agent;
   b) a plurality of participant agents;
   c) a repository;
   d) a network Bus;
   e) a plurality of monitors;
   f) a service map comprising service component classes, policies, and a discovery tree;
   g) a first program code for discovering instances of a root component of said service map;
   h) a second program code using said policies and said service map to determine locations in said distributed system for discovering instances of auxiliary components of said service that are coupled to one of said instances of a root component;
   i) a third program code continuing said discovering instances of auxiliary components until a quorum of instances of each component class included in said service map is discovered;
   j) a fourth program code determining a parent component instance for each discovered instance of an auxiliary component; and
   k) a fifth program code grouping all discovered instances with their parent component instances to form service groups comprising all instances of components contained by each of said instances of a root component.

19. The apparatus as claimed in claim 18, wherein said discovering is controlled by a coordinator agent, a portion of said discovering is performed by participant agents as directed by said coordinator agent, said service map and the discovered instances are stored in a Common Information Model Object Manager, CIMOM, repository connected to said coordinator agent, and instance information is updated by monitors issuing repeated messages.

20. The apparatus as claimed in claim 19, wherein messages between said coordinator agent, said participant agents and said monitors are transmitted across a network bus.

* * * * *